Feb. 9, 1965  R. R. CAPRANICA  3,169,168
VALIDITY CHECKING CIRCUIT
Filed Aug. 24, 1960

INVENTOR
R. R. CAPRANICA
BY
ATTORNEY

United States Patent Office 3,169,168
Patented Feb. 9, 1965

3,169,168
VALIDITY CHECKING CIRCUIT
Robert R. Capranica, New Providence, N.J., assignor to Bell Telephone Laboratories, Incorporated, New York, N.Y., a corporation of New York
Filed Aug. 24, 1960, Ser. No. 51,617
8 Claims. (Cl. 179—6.3)

This invention relates to telephone substation apparatus and, more particularly, to validity checking circuits for credit card operated public telephones.

In order to improve the ease and efficiency with which public telephones are used, it has been suggested that various types of credit cards be utilized to operate public pay stations, rather than by the presently used means of depositing coins. Such a credit card system not only improves customer's service but also permits significant operating economies to the telephone companies. One such credit card system is disclosed in 3,087,018 issued to W. Pferd on April 23, 1963.

In the credit card telephone system disclosed in the Pferd application, the credit card is formed of material having a controlled resistivity. Contacts engaging the card when it is inserted in the pay station apparatus connect the resistance of the credit card into a bridge circuit. The bridge circuit remains in balance and permits the use of the station apparatus only if its resistance falls within a preselected range of resistances.

Bridge circuits such as that shown in the Pferd application, however, must be relatively high impedance devices in order to obtain the low power dissipation desired and hence require a substantial voltage at the pay station location for their operation. Separate voltage sources at the pay station location are therefore required. Furthermore, in order to generate an unbalance sufficiently large for economical detection, bridge circuits are arranged to permit operation for a relatively broad range of credit card resistances.

An object of the present invention is to increase the protection against fraudulent usage of credit card operated public telephone apparatus.

A more particular object of the invention is to test the resistivity of a credit card by means of circuits requiring low voltages for their operation and which consume negligible amounts of power.

A further object of the invention is to operate a credit card validity checking circuit from a central office supply battery.

In accordance with the present invention, transistors are utilized to increase the sensitivity of a resistance checking circuit for use in credit card operated public telephone systems. A reference voltage is derived from the central office battery over the telephone line to the pay station location by means of a semiconductor junction breakdown diode known as a "Zener" diode. A voltage divider, including the resistance of the credit card to be checked, is connected across this source of reference potential. Two transistor-operated relay circuits are similarly connected across the reference diode.

Base operating voltage for each of the transistors is derived from a separate point on the voltage divider. Hence, the voltages supplied to the bases of these transistors are dependent on the value of the resistance of the credit card. By a proper choice of energizing potentials for the transistor circuits, one such transistor circuit may be designed to operate only when the credit card resistance is above a minimum value and the other transistor circuit may be designed to operate only when the credit card resistance is below a maximum value. Since the two transistor operated relay circuits are separate and independent, these operating limits may be chosen such that both relay circuits operate only when resistance of the credit card falls within a very narrow range of values. Contacts operated by these relays enable the pay station apparatus only when both relays are operated.

A major advantage of the circuit of the present invention is its extremely high sensitivity to variations in the resistances of the credit card. This is important in public credit card operated telephone systems because of the correspondingly high security against fraudulent usage desired. Furthermore, the validity checking circuit of the present invention can be energized solely from the central office battery and hence requires no separate local source of energy. This is made possible by the low voltage and low power requirements of the circuit.

These and other objects and features, the nature of the present invention and its various advantages, may be more readily understood in considering the attached drawing and the following detailed description of the drawing.

Figure 1:
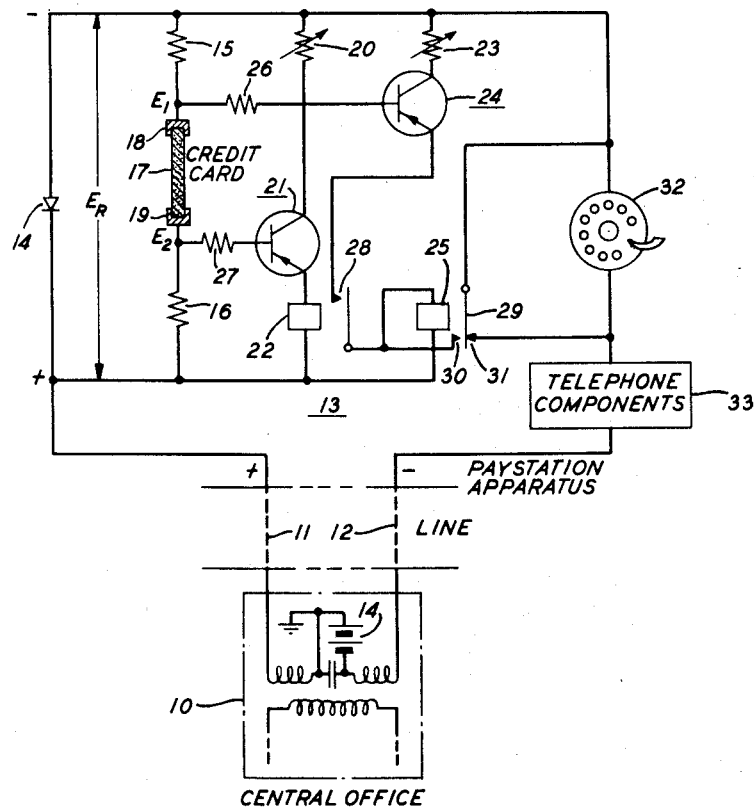
FIG. 1 is a schematic diagram of a credit card validity checking circuit in accordance with the present invention.

Referring more particularly to FIG. 1, there is shown a credit card validity checking circuit in accordance with the present invention including a central office location 10 connected by telephone lines 11 and 12 to pay station apparatus 13. Included in central office 10 is a central office battery 14 arranged to apply a direct current potential to lines 11 and 12 poled such that line 11 is at ground potential and line 12 negative.

Figure 1A:
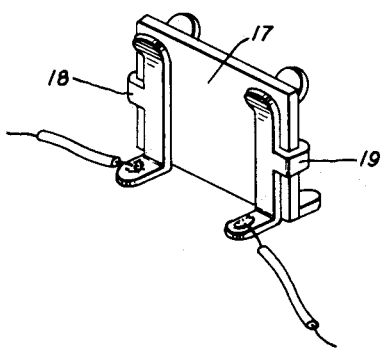
FIG. 1A is a perspective view of credit card holding apparatus useful in the circuit of FIG. 1.

Included in the pay station apparatus 13 is a semiconductor breakdown diode 14 of the so-called "Zener" type. That is, diode 14, when energized by sufficient voltage in the backward direction, breaks down and provides an essentially constant voltage $E_R$ across its terminals. Connected across diode 14 is a voltage divider including resistors 15 and 16 and a credit card 17, positioned in the voltage divider by conductive card holders 18 and 19. Holders 18 and 19 provide a low impedance connection to the material of credit card 17 and may be arranged to contact a conductive film deposited at the edges of card 17. FIG. 1A shows one possible arrangement of holders 18 and 19. Numerous other configurations would, of course, be equally suitable, provided only that adequate low resistance contacts are made to card 17.

Card 17 is fabricated of material of controlled resistivity and having mechanical properties suitable for carrying in a wallet or purse. Standard plastic materials such as polyethylene or polyvinyl chloride based materials, mixed with controlled amounts of carbon black, rolled into sheets and formed by compression molding, provide credit cards with the appropriate properties.

A transistor operated relay circuit including variable resistor 20, p-n-p transistor 21 and relay winding 22 is also connected across diode 14. A similar transistor-operated relay circuit, including variable resistor 23, p-n-p transistor 24 and relay winding 25, is also connected across diode 14. The point intermediate between resistor 15 and card holder 18 is connected by way of resistor 26 to the base electrode of transistor 24. The point intermediate between resistor 16 and card holder 19 is connected by way of resistor 27 to the base of transistor 21. Resistors 26 and 27 are of relatively high value to limit current drain from the divider circuit. The operation of the circuit of FIG. 1 may be more readily understood by reference to the voltage characteristic shown in FIG. 2.

Figure 2:
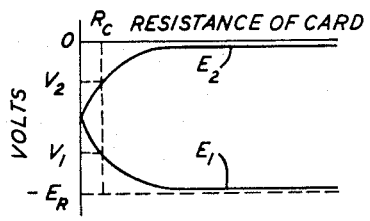
FIG. 2 is a graphical representation of the voltage versus resistance characteristic of the voltage divider shown in FIG. 1.

Referring then to FIG. 2, there is shown a graphical illustration of the intermediate voltages on the voltage divider versus the resistance of the credit card 17. Voltage curve $E_1$, for example, appears on the voltage divider intermediate between resistor 15 and card holder 18 and hence is applied to the base of transistor 24. Voltage curve $E_2$ appears on the voltage divider between resistor 16 and card holder 19 and hence is applied to the base of transistor 21.

In FIG. 2 it can be seen that the voltage $E_1$ has some fixed value when the resistance of the card is zero and gradually decreases from this value, approaching the voltage $-E_R$ as the resistance of the card increases to infinity. The voltage $E_2$ has the same value as $E_1$ when the resistance of the card is zero, but gradually increases from this value as the card resistance increases, approaching zero voltage as the resistance of the card approaches infinity. It can be seen that if the resistance of credit card 17 has the value of $R_C$ as shown on a graph of FIG. 2, the voltages $E_1$ and $E_2$ will have the values $V_1$ and $V_2$, respectively.

Returning to FIG. 1, variable resistance 20 is adjusted such that the current passed by transistor 21 with the potential $V_2$ applied to its base is just above the operate current for relay winding 22. A credit card having the proper resistance, $R_C$, and hence producing the voltage $V_2$ at the base of transistor 21, will therefore operate relay 22 and close contacts 28. Any higher resistivities of the card 17 will not provide a sufficiently negative voltage at the base of transistor 21 to operate relay 22. Contacts 28 are arranged to close the transistor-operated relay circuit including transistor 24 and relay 25.

Rheostat 23 is now adjusted such that transistor 24 conducts a current just above the operate current for relay winding 25 with the voltage $V_1$ applied to its base. Relay winding 25 therefore closes armature 29 to contact 30 and away from contact 31. The closure of armature 29 to contact 30 provides a latching circuit for relay 25 which bypasses the validity checking circuit. Any lower resistivities of the card 17 will not provide a sufficiently negative voltage at the base of transistor 24 to operate relay 25.

The circuit including armature 29 and normally closed contact 31 is arranged to short-circuit the dialing contacts of dial 32 and thus render dial 32 inoperative for initiating calls at pay station 13. The operation of relay 25 interrupts this short circuit at contact 31 and thus enables the use of dial 32 to extend calls from pay station 13. Since relay 25 would tend to release due to the interruption of the current in its winding when dial 32 is operated to produce dial pulses, relay 25 is arranged to be of the slow to release type and hence holds during the brief dial pulse interruptions. The remainder of the speech and signaling circuits for pay station 13 are contained in block 33 and may comprise any standard circuit known in the art.

From the above description it can be seen that the validity checking circut of the present invention provides a simple, compact, economical means for insuring against the fraudulent use of credit card operated public telephones. The circuit may be easily adjusted to respond to cards of different resistivities by means of variable resistances 20 and 23.

It should be noted that the sensitivity of the circuit is greatest when the card resistance is smallest. This can be seen in FIG. 2 where the sensitivity of the circuit is measured by the slopes of the voltage curves. Another reason for keeping the resistance of the card low is to insure the low impedance of the entire validity checking circuit. Since this circuit is normally in series with the telephone loop, a low impedance is desirable. Similarly, variable resistances 20 and 23 also should be low impedance devices on the order, for example, of 500 ohms maximum resistance.

Relays 22 and 25 are sensitive current-responsive relays preferably having a small differential between their operate and release currents. Transistors 21 and 24 are preferably arranged to go into saturation when proper voltages are applied to their base electrodes. Such operation diminishes the effects of environmental factors such as temperature and humidity and the effect of substituting components.

It is to be understood that the above-described arrangements are merely illustrative of the numerous and varied other arrangements which may constitute applications of the principles of the invention. Such other arrangements may readily be devised by those skilled in the art without departing from the spirit or scope of the invention.

What is claimed is:

1. In a telephone system, a central office including a source of potential, a substation and a transmission line interconnecting said central office and said substation, said substation including means for deriving a substantially constant reference potential from said source of potential at said central office, a plurality of impedances serially connected across said reference potential deriving means, one of said impedances comprising means for receiving a credit card of material of controlled resistivity, a plurality of transistors, impedance means connecting the base electrodes of said transistors to various points between said serially connected impedances, current-responsive means connected in series with the collector-emitter path of each of said transistors and means responsive to one of said current-responsive devices for disabling one other of said current-responsive devices until said one device is operated.

2. In combination, a source of reference potential, a voltage divider connected across said source of reference potential and including means for receiving an electrical conducting device of unknown impedance, a plurality of transistors, means connecting the base electrodes of each of said transistors to a different point on said voltage divider, a plurality of circuit connection enabling devices, one of said enabling devices being responsive to a certain threshold current in the collector-emitter path of one of said transistors to enable the circuit connection of the collector-emitter path of another one of said transistors, another one of said enabling devices being responsive to a certain threshold current in the collector-emitter path of said another one of said transistors to enable the circuit connection of a service facility electrical device.

3. The combination according to claim 2 further including a remote source of energizing potential and wherein said source of reference potential comprises a constant voltage breakdown device operated from said remote source.

4. The combination according to claim 3 further including means to enable one of said current responsive devices above a minimum value of impedance of said electrical conducting device and means to enable another one of said current responsive devices up to a maximum value of impedance of said electrical conducting device.

5. An impedance responsive circuit comprising a source of reference potential, a voltage divider connected across said source, means included in said voltage divider for receiving an impedance to be checked, a first transistor having its base electrode connected to one terminal of said receiving means, a second transistor having its base electrode connected to the other terminal of said receiving means, current-responsive means connected in the collector-emitter circuit of each of said transistors for detecting the current levels flowing through said collector-emitter circuits, the current responsive means in the collector-emitter path of said first transistor including means to enable the circuit connection of the collector-emitter path of said second transistor, and the current responsive means in the collector-emitter path of said second transistor including means to enable the circuit connection of an indicating means to indicate the value of said impedance to be checked.

6. Credit card operated apparatus comprising a source of reference potential, a voltage dividing circuit connected across said source of reference potential, means for receiving a credit card of controlled resistivity in said voltage dividing circuit, said credit card receiving means being separated from said source by fixed impedance elements, a plurality of series circuits each including a variable resistance, the collector-emitter path of a transistor and the winding of a current sensitive relay, connected across said source of reference potential, all but one of said series circuits being normally disabled, means connecting the base electrodes of said transistors to said voltage dividing circuit, and means responsive to the relay winding in said one series circuit for enabling the remainder of said series circuits.

7. The credit card operated apparatus according to claim 6 further including a central station, a source of energizing potential at said central station, a pair of conductors connecting said central station and said credit card operated apparatus, normally disabled means at said credit card operated apparatus for signaling said central station, and means responsive to the concurrent energization of all of said relay windings for enabling said normally disabled signal means.

8. In a telephone system, a central office including a source of potential, a substation and a transmission line interconnecting said central office and said substation, said substation including means for deriving a substantially constant reference potential from said source of potential at said central office, a normally disabled signaling means and credit card operated apparatus for enabling said normally disabled signaling means, said credit card operated apparatus comprising an impedance responsive circuit comprising a voltage divider connected across said means for deriving a substantially constant reference potential, means included in said voltage divider for receiving a credit card of controlled resistivity, a first transistor having its base electrode connected to one terminal of said receiving means, a second transistor having its base electrode connected to the other terminal of said receiving means, current responsive means connected in the collector-emitter circuit of each of said transistors for detecting the current levels flowing through said collector-emitter circuits, the current responsive means in the collector-emitter path of said first transistor including means to enable the circuit connection of the collector-emitter path of said second transistor, and the current responsive means in the collector-emitter path of said second transistor including means to enable the circuit connection of an indicating means to indicate the value of said impedance to be checked.

References Cited in the file of this patent
UNITED STATES PATENTS

| | | |
|---|---|---|
| 1,353,673 | Symes | Sept. 21, 1920 |
| 1,989,621 | Lesoine | Jan. 29, 1935 |
| 2,179,023 | Schauweker | Nov. 7, 1939 |
| 2,180,611 | Schauweker | Nov. 21, 1939 |
| 2,667,970 | Bregar | Feb. 2, 1954 |
| 2,831,126 | Linvill | Apr. 15, 1958 |
| 2,946,951 | Boode | July 26, 1960 |
| 3,046,418 | Eachus | July 24, 1962 |

FOREIGN PATENTS

| | | |
|---|---|---|
| 797,542 | Great Britain | July 31, 1956 |